(12) United States Patent
Depner et al.

(10) Patent No.: US 11,018,603 B2
(45) Date of Patent: May 25, 2021

(54) DRIVE UNIT FOR AN ADJUSTMENT SYSTEM OF A MOTOR VEHICLE, AND METHOD FOR OPERATING A DRIVE UNIT

(71) Applicant: Robert Bosch GmbH, Stuttgart (DE)

(72) Inventors: Dieter Depner, Lichtenau (DE); Stefan Gerstl, Karlsruhe (DE)

(73) Assignee: Robert Bosch GmbH, Stuttgart (DE)

( * ) Notice: Subject to any disclaimer, the term of this patent is extended or adjusted under 35 U.S.C. 154(b) by 176 days.

(21) Appl. No.: 16/380,870

(22) Filed: Apr. 10, 2019

(65) Prior Publication Data

US 2019/0319559 A1     Oct. 17, 2019

(30) Foreign Application Priority Data

Apr. 12, 2018 (DE) ............. 10 2018 205 580.7

(51) Int. Cl.
| | |
|---|---|
| *G01R 31/34* | (2020.01) |
| *H02P 6/00* | (2016.01) |
| *H02P 21/06* | (2016.01) |
| *H02P 29/024* | (2016.01) |
| *H02K 11/215* | (2016.01) |
| *B60J 1/14* | (2006.01) |

(52) U.S. Cl.
CPC ............ *H02P 6/007* (2013.01); *H02K 11/215* (2016.01); *H02P 21/06* (2013.01); *H02P 29/024* (2013.01); *B60J 1/14* (2013.01)

(58) Field of Classification Search
CPC ........ H02P 6/007; H02P 21/06; H02P 29/024; H02P 6/16; H02K 1/17; H02K 11/215; H02K 1/24; H02K 23/62; H02K 29/08; H02K 11/40; H02K 49/10; B60J 1/14; E05F 15/697; E05F 15/0008; E05F 15/0017; E05F 15/2038; E05Y 2201/49; E05Y 2900/55; E05Y 2201/474; E05Y 2201/434; E05Y 2600/46

See application file for complete search history.

(56) References Cited

U.S. PATENT DOCUMENTS

| | | | | |
|---|---|---|---|---|
| 7,554,234 B2 * | 6/2009 | Yokomori | ............... | H02K 49/10 310/77 |
| 8,823,228 B2 * | 9/2014 | Mili | ........................ | F16H 1/16 310/83 |
| 8,991,103 B2 * | 3/2015 | Schlesiger | ........... | H02H 7/0858 49/506 |

(Continued)

FOREIGN PATENT DOCUMENTS

| | | |
|---|---|---|
| DE | 102015201600 | 8/2016 |
| DE | 102015226429 | 6/2017 |
| DE | 102016204954 | 9/2017 |

*Primary Examiner* — Vinh P Nguyen
(74) *Attorney, Agent, or Firm* — Michael Best & Friedrich LLP

(57) ABSTRACT

A drive unit for an adjustment system for a motor vehicle has an adjustable element moved by an electric motor. The dive motor is operated electromagnetically. A magnetic field sensor is arranged on a pole pot or a housing of the drive motor to provide an electrical sensor signal dependent on a magnetic field. A control unit is configured to detect the magnetic field. The magnetic field varies on rotation of a rotor of the drive motor, so that a relative position change of the adjustable element can be derived from the electrical sensor signal.

17 Claims, 2 Drawing Sheets

(56) References Cited

U.S. PATENT DOCUMENTS

2008/0155901 A1\* 7/2008 Rietdijk ................ E05F 15/689
                                                              49/349
2017/0063204 A1   3/2017 Dumas
2017/0279330 A1\* 9/2017 Willner .................. H02K 11/40

\* cited by examiner

DRIVE UNIT FOR AN ADJUSTMENT SYSTEM OF A MOTOR VEHICLE, AND METHOD FOR OPERATING A DRIVE UNIT

BACKGROUND OF THE INVENTION

The invention concerns adjustment systems for motor vehicles, such as for example window lifter systems, sliding roof systems and similar, which are operated by a drive unit driven by an electric motor for opening or closing by an adjustable element. The present invention furthermore concerns measures for detecting a position of the adjustable element in an adjustment system for a motor vehicle.

In adjustment systems in motor vehicles, e.g. window lifter systems, sliding roof systems and similar, a drive unit driven by an electric motor moves adjustable elements, such as for example window panes or sunroofs, in a corresponding bodywork opening in order to open or close these. For certain functions, in particular to ensure a trap-protection function, it is necessary to detect the position of the adjustable element. The trap-protection function guarantees a restriction of an adjustment force for the adjustable element, and/or a stoppage or reversal of an adjustment movement, if it is detected that an object or body part is present between the adjustable element to be moved and the edge of the opening and there is a risk of trapping.

The position of the adjustable element is usually detected indirectly using a position detection system based on detection of relative rotary movements of a drive motor of the drive unit of the adjustment system. Since the drive unit is coupled to the adjustable element via a rigid gear mechanism, and hence a movement of the drive motor is converted into a movement of the adjustable element following a fixed translation ratio, the position of the adjustable element can be detected by detecting the travel resulting from the rotary movement of the drive motor from a defined starting state of the adjustable element.

For detecting a rotary movement of the drive motor, for example position detectors may be used which can detect a relative rotation of a shaft of the drive motor by a change in a magnetic field of a ring magnet arranged on the shaft, using a stationarily installed magnetic field sensor. The rotary movement of the drive motor may be established irrespective of the powering of the drive motor and the design of the electromagnetic circuit of the electric motor. However, the provision of such a position detector, and in particular the provision of the additional ring magnet on the shaft, entails an increased complexity with regard to installation space, cost and weight.

Furthermore, a position of the drive motor may be detected via a current ripple of a magnetic current. To analyze the current ripple however, a complex analysis algorithm must be implemented, and also current measurement elements increase the cost and reduce the efficiency of the drive motor.

SUMMARY OF THE INVENTION

It is an object of the present invention to provide an improved drive unit for an adjustment system in a motor vehicle, and an adjustment system, with which a position of an adjustable element can be reliably detected and the structural complexity and implementation cost significantly reduced.

This object is achieved by a drive unit for an adjustment system for a motor vehicle, and by the adjustment system and the method for operating an adjustment system.

According to a first aspect, a drive unit for an adjustment system, in particular in a motor vehicle, with an adjustable element moved by an electric motor, comprises:
 a drive motor operated by an electromagnet,
 a magnetic field sensor which is arranged on a pole pot of the drive motor in order to provide an electrical sensor signal dependent on the magnetic field,
 a control unit which is configured to actuate the drive motor and detect a magnetic field which varies on rotation of a rotor of the drive motor so that a relative position change of the adjustable element can be derived from the electrical sensor signal.

A concept of the above-mentioned drive unit is to detect a rotor movement by a change in an external magnetic field part caused by rotation of the rotor, in order to detect a position change. For this, a magnetic field sensor is arranged on an outside of a housing of the drive motor in order to detect, outside the drive motor, a magnetic field change caused by rotation of the rotor inside the drive motor. The change in magnetic field is detected by a change in angle of the armature of the rotor.

Depending on the type of drive motor, namely whether the drive motor is a brush-commutated direct current motor or a motor excited by permanent magnet, the magnetic field of the armature is created by a rotor coil or a permanent magnet. Usually, the housing of the drive motor is formed as a pole pot which is normally made of a soft magnetic material and is therefore magnetically conductive. The pole pot usually conducts a majority of the magnetic field situated inside the drive motor in the circumferential direction, so that only a small part of the magnetic field reaches the external environment of the drive motor via the outside of the pole pot.

Because of the relatively strong magnetic fields inside the drive motor and the high sensitivity of magnetic field sensors, however, such a magnetic field produced in the external environment can be detected, so an arrangement of the magnetic field sensor radially offset to the rotor of the drive motor may be used. In this way, a direct change, caused by an angle change of the rotor, in the magnetic field produced by the drive motor can be detected. When a counter is used, now the sensor signals dependent on the rotary speed of the rotor and detected by a magnetic field sensor can be used to decrement and increment the counter. Because of a rigid coupling of the drive motor to the adjustable element of the adjustment system, the counter value then represents a position of the adjustable element on the window lifter system.

Furthermore, the magnetic field sensor may be arranged on an outside of the pole pot and radially opposite the motor.

According to a further aspect, the pole pot may have a flattened region on which the magnetic field sensor is arranged, wherein the flattened region is situated in particular at a space between two adjacent stator magnets.

Furthermore, the drive motor may have stator magnets arranged on an inside of a casing of the pole pot, wherein the magnetic field sensor is arranged on a region of the pole pot which is defined by a space between two adjacent stator magnets.

According to one embodiment, the pole pot may be formed from a soft magnetic material.

In particular, the drive motor may have stator magnets arranged on an inside of a casing of the pole pot, wherein this at least one region has a magnetic saturation due to the magnetic connection of the magnetic field of the stator magnets through the pole pot, wherein the magnetic field sensor is arranged on the pole pot in the region of the magnetic saturation.

According to a further aspect, an adjustment system, in particular a window lifter system for a motor vehicle, is provided with the above-mentioned drive unit and an adjustable element.

BRIEF DESCRIPTION OF THE DRAWINGS

Embodiments are explained in more detail below with reference to the attached drawings. The drawings show.

DETAILED DESCRIPTION

Figure 1:
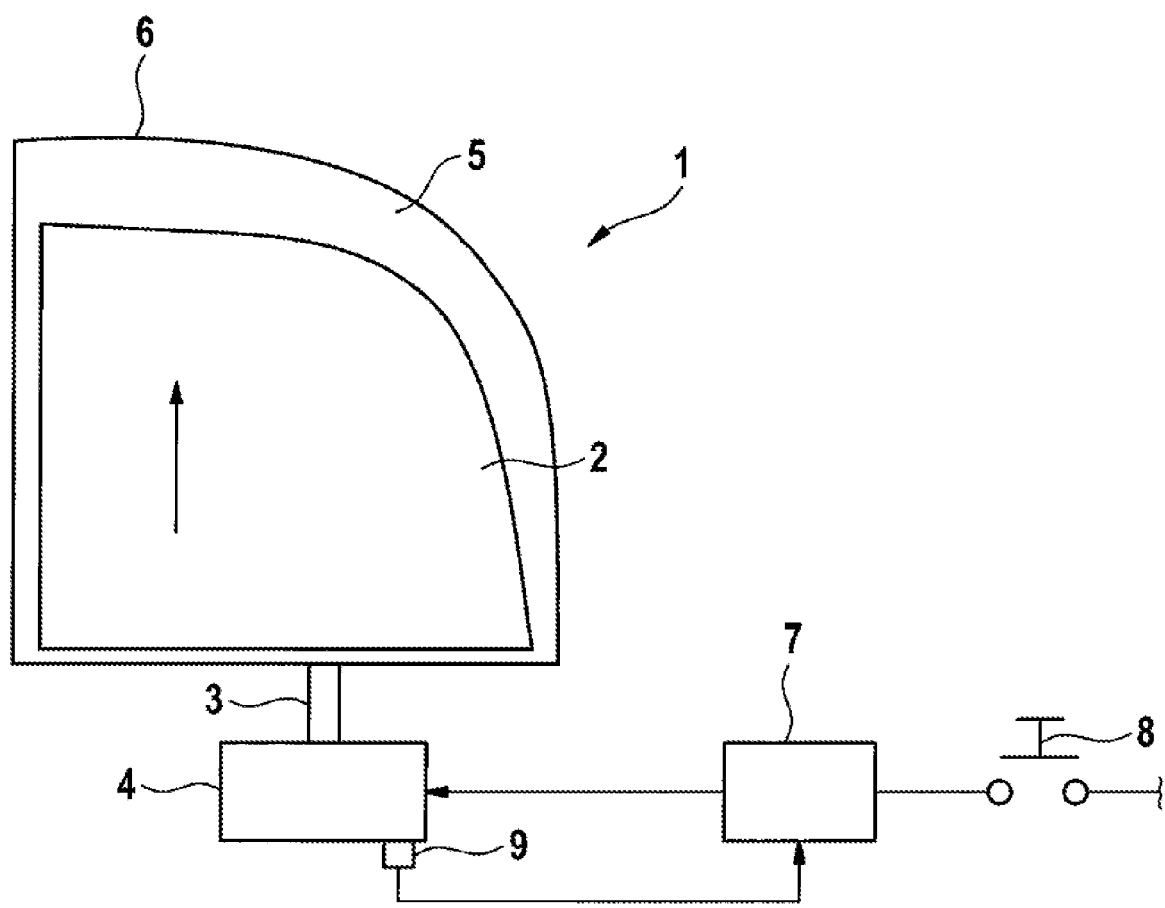
FIG. 1 a diagrammatic depiction of a window lifter system for a motor vehicle, and FIG. 2 a cross-sectional depiction through a drive motor of the drive unit of the adjustment system in FIG. 1, with a positioning of the magnetic field sensor on a pole pot of the drive motor.

FIG. 1 shows, as an example of an adjustment system, an automatic window lifter system 1 (adjustment system) for a side window of a motor vehicle, in which a window pane 2 as an adjustable element is movable by means of a closing mechanism 3 in a window frame 5. The window pane 2 is driven by a drive motor 4 via a closing mechanism 3, which may comprise a suitable gear mechanism. In the present exemplary embodiment, the window pane 2 is moved upward (in the direction of the arrow) to close the window, wherein the window pane 2 reaches a closed position at a stop edge 6 of the window frame 5.

The drive motor 4 is actuated by a control unit 7 depending on an actuation of a control element 8 so that the window pane 2 moves in a predefined direction. For example, on actuation of the control element 8 for closing the window, the window pane 2 is moved upward, i.e. in a closing direction, by rotation of the drive motor 4, so that the window pane 2 executes a closing movement. Similarly, on actuation of the control element 8 for opening the window, the window pane 2 may be moved down, i.e. in an opening direction, by an opposite rotation of the drive motor 4, so that the window pane 2 executes an opening movement.

It is furthermore possible, by actuation of the control element 8 in a specific fashion, to activate an automatic mode in which, even after release of the actuating element 8, the previously specified movement of the window pane 2 is continued until either the control element 8 is actuated again or the window pane 2 has reached a stop position in a fully open position or a fully closed position.

Furthermore, the drive motor 4 may be provided with a position sensor 9 which can detect a relative position change in a movement of the window pane 2. For this, the position sensor 9 is arranged on the drive motor so that, on rotation of a rotor of the drive motor 4, corresponding to the rotation movement, pulses are output which may be used for incrementing or decrementing a position counter implemented in the control unit 7. The respective counter value of the position counter then constitutes a position datum for a position of the window pane 2.

To detect the position of the rotor of the drive motor 4, a magnetic field sensor 91, 92 is arranged on an outside (see magnetic field sensor 91) or inside (see magnetic field sensor 92) of the housing of the drive motor 4 and constitutes the position sensor 9. Since normally the housing of the drive motor 4 is formed by the pole pot 42, the position sensor 9 may be connected directly to the pole pot 42. A pole pot 42 is a substantially pot-like body which is made from a soft magnetic metal material and serves to receive stator and/or rotor components of a drive motor 4.

Figure 2:
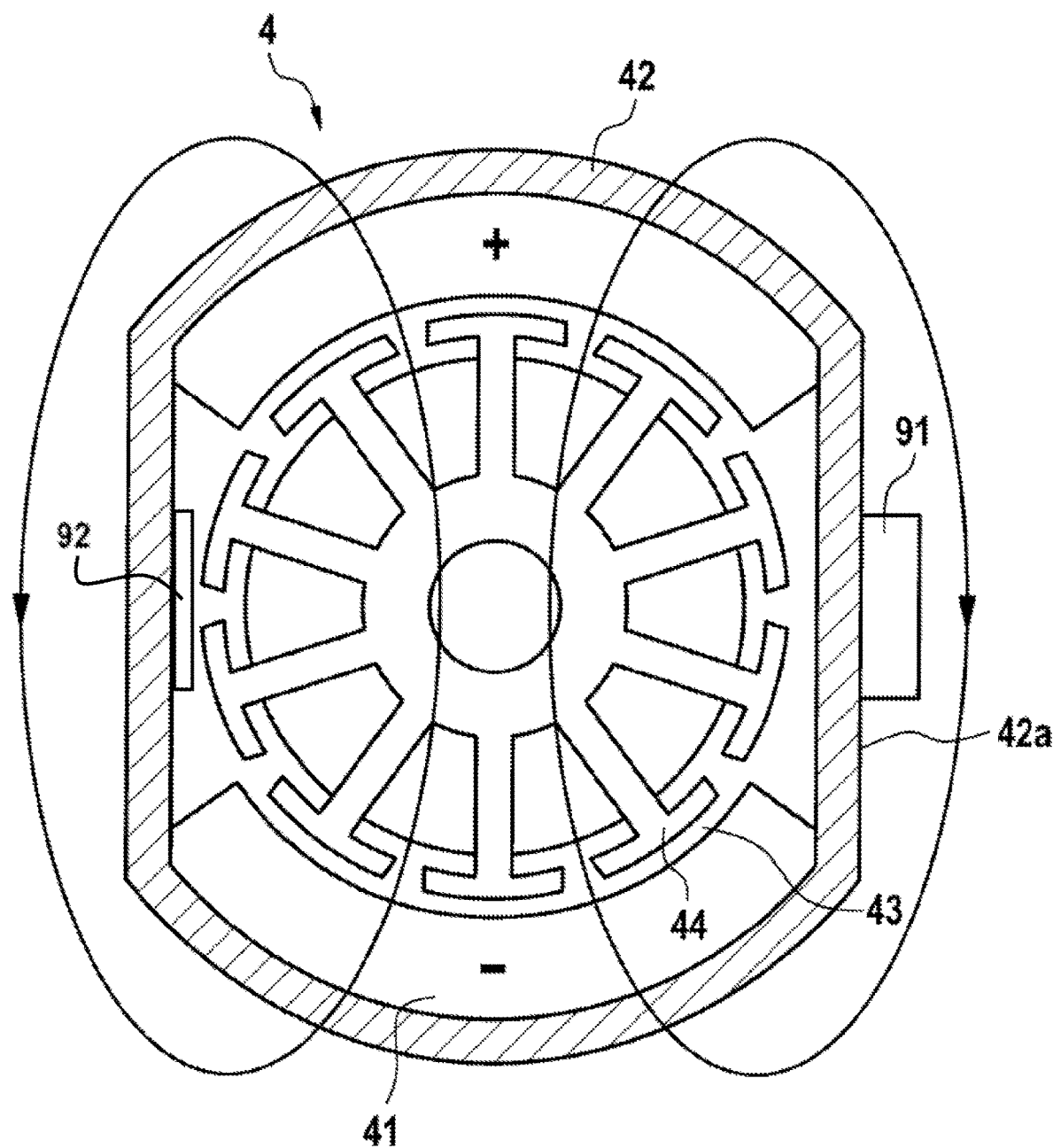

FIG. 2 shows a cross-sectional depiction through an exemplary drive motor 4 in the form of a brush-commutated direct current motor with two opposing stator magnets 41, which are arranged in a cylindrical pole pot 42 and define an inner recess 43 in which a rotor 44 provided with rotor coils is arranged in a rotationally movable fashion. The pole pot 42 forms a housing of the drive motor 4.

The pole pot 42 is preferably made of a soft magnetic material and thus conducts a motor magnetic field, generated inside the pole pot, between the permanent magnets of the stator arrangement. Thus the pole pot 42 may constitute a partial magnetic circuit. However, usually the pole pot 42 is made of a metal material, so that the magnetic field formed inside the drive motor 4 by the stator magnets 41 and the powered rotor 44, in particular because of a magnetic saturation, cannot be completely diverted by the material of the pole pot 42 and part of the magnetic field emerges into the external environment of the pole pot 42. By the arrangement of the magnetic field sensor 91 on the outside of the pole pot 42, it is then possible to detect the part of the motor magnetic field passing through the pole pot 42.

The magnetic field sensor 91 may be configured as a Hall sensor or as a magneto-resistive sensor, e.g. a GMR sensor.

Because of the rotation of the rotor 44, a temporal change in the motor magnetic field occurs because of the angle change of the rotor of the drive motor 4. Depending on the position of the rotor 44 in the stator magnetic field and/or in interaction with the transverse field generated by powering the rotor 44, a magnetic field intensity results for the magnetic field emerging from the pole pot 42.

The magnetic field sensor 91 detects the change in magnetic field and generates a corresponding electrical detection signal, which is provided for evaluation at the control unit 7. There, based on fluctuations in the detection signal, a movement of the rotor 44 can be established and hence a relative position change of the rotor 44 detected.

In the exemplary embodiment of the drive motor 4 shown in FIG. 2, stator magnets 41 are arranged on the inner face of the pole pot 42 only in parts of the circumferential region. Between the stator magnets 41 are regions in which no stator magnet 41 is provided, and the magnetic field produced by the rotor 44 or the change in magnetic field acts directly on the corresponding portion of the pole pot 42. In particular, the pole pot 42 may be formed with at least one flattened region 42a of its casing surface, wherein no stator magnet is arranged on the inside of the flattened region 42a.

The magnetic field sensor 91 is preferably arranged on the outside of the flattened region 42a of the pole pot 42. Thus the varying magnetic field produced on operation of the drive motor can act directly on the magnetic field sensor 91. Furthermore, mounting on the flattened region 42a of the pole pot 42 simplifies the mechanical attachment by means of a bonded connection. Alternatively, the magnetic field sensor 92 may also be arranged on the inside of the pole pot 42. The magnetic field sensor 91, 92 may be arranged directly on the housing wall so that no circuit boards are required for this. The signal lines of the magnetic field sensor 91, 92 then lead directly to the control unit 7, in order to determine the rotary position of the rotor 44 and hence in particular also the position of the adjustable element.

In an alternative embodiment, the drive motor 4 may also be provided as an electronically commutated motor, in particular a synchronous machine. For this, instead of the stator magnets 42, a stator with stator coils is provided, while the rotor is provided with permanent magnets. The basic principle of detecting the rotor position by measuring a varying magnetic field caused by rotation of the rotor is also possible with such an embodiment.

By using magnetic field sensors 91, 92 to detect a rotor position of the drive motor 4, the advantages of the known concepts are combined. Firstly, there is no need for additional signal emitters such as a ring magnet on the shaft of the drive motor, and hence installation space and weight can be saved. Secondly, the system is also able to detect a passive rotational movement when the drive motor is loaded by force applied to the adjustable element. Furthermore, an electromagnetic design of the rotor 44 and/or stator 42, which reduces the efficiency, for sensorless position detection can be omitted.

What is claimed is:

1. A drive unit for an adjustment system configured to be coupled to an adjustable element, the drive unit comprising:
   an electromagnetically operated drive motor,
   a magnetic field sensor arranged on a housing of the drive motor that provides an electrical sensor signal dependent on a magnetic field generated by the drive motor and that varies on rotation of a rotor of the drive motor, and
   a control unit configured to receive the electrical sensor signal and derive a relative position change of the adjustable element from the electrical sensor signal,
   wherein the drive motor has stator magnets arranged on an inside of the housing, and wherein the magnetic field sensor is arranged on a region of the housing which is defined by a space between two adjacent stator magnets.

2. The drive unit according to claim 1, wherein the magnetic field sensor is arranged on an outside of the housing and radially opposite the rotor.

3. The drive unit according to claim 1, wherein the magnetic field sensor is arranged on an inside of the housing and radially opposite the rotor.

4. The drive unit according to claim 1, wherein the housing has a flattened region on which the magnetic field sensor is arranged.

5. The drive unit according to claim 1, wherein the housing is formed from a soft magnetic material.

6. The drive unit according to claim 5, wherein at least one region is saturated by the magnetic field through the housing, and wherein the magnetic field sensor is arranged on the housing in the at least one region of the magnetic field saturation.

7. The drive unit according to claim 1, wherein the rotor has radial teeth on which electrical coils are wound, and wherein the drive motor is a brush-commutated direct current motor.

8. The drive unit according to claim 1, wherein the stator magnets are magnetized in a radial direction.

9. An adjustment system, in particular a window lifter system or a sliding roof system or a seat adjustment for a motor vehicle, wherein the adjustment system includes the drive unit according to claim 1 and the adjustable element.

10. A drive unit for an adjustment system configured to be coupled to an adjustable element, comprising:
    an electromagnetically operated drive motor including stator magnets,
    a magnetic field sensor arranged on a pole pot of the drive motor that provides an electrical sensor signal dependent on a magnetic field generated by the drive motor and that varies on a rotation of a rotor of the drive motor, and
    a control unit configured to receive the electrical sensor signal and derive relative position change of the adjustable element from the electrical sensor signal,
    wherein the stator magnets produce a magnetic field whose magnetic field lines run from a first stator magnet of the stator magnets through the rotor to a second stator magnet of the stator magnets that is radially opposite of the first stator magnet, and wherein the stator magnets include, in total, two or four or six stator magnets.

11. The drive unit according to claim 10, wherein the magnetic field sensor is arranged on an outside of the pole pot and radially opposite the rotor.

12. The drive unit according to claim 10, wherein the magnetic field sensor is arranged on an inside of the pole pot and radially opposite the rotor.

13. The drive unit according to claim 10, wherein the pole pot has a flattened region on which the magnetic field sensor is arranged, wherein the flattened region is situated at a space between two adjacent stator magnets.

14. A drive unit according to claim 10, wherein the drive motor has stator magnets arranged on an inside of a casing of the pole pot, wherein the magnetic field sensor is arranged on a region of the pole pot which is defined by a space between two adjacent stator magnets.

15. The drive unit according to claim 10, wherein the pole pot is formed from a soft magnetic material.

16. The drive unit according to claim 15, wherein the drive motor has stator magnets arranged on an inside of a casing of the pole pot such that at least one region is saturated by the magnetic field through the pole pot, wherein the magnetic field sensor is arranged on the pole pot in the at least one region of the magnetic field saturation.

17. The drive unit according to claim 10, wherein the rotor has radial teeth on which electrical coils are wound, wherein the drive motor is a brush-commutated direct current motor.

* * * * *